(12) United States Patent
Bivans

(10) Patent No.: US 11,947,331 B2
(45) Date of Patent: Apr. 2, 2024

(54) SYSTEMS AND METHODS FOR SAFETY-ENABLED CONTROL

(71) Applicant: Fort Robotics, Inc., Philadelphia, PA (US)

(72) Inventor: Nathan Bivans, Philadelphia, PA (US)

(73) Assignee: Fort Robotics, Inc., Philadelphia, PA (US)

( * ) Notice: Subject to any disclaimer, the term of this patent is extended or adjusted under 35 U.S.C. 154(b) by 0 days.

(21) Appl. No.: 18/112,894

(22) Filed: Feb. 22, 2023

(65) Prior Publication Data

US 2023/0305516 A1 Sep. 28, 2023

Related U.S. Application Data

(62) Division of application No. 16/937,299, filed on Jul. 23, 2020, now abandoned.

(60) Provisional application No. 62/985,625, filed on Mar. 5, 2020, provisional application No. 62/898,962, filed on Sep. 11, 2019, provisional application No. 62/879,102, filed on Jul. 26, 2019.

(51) Int. Cl.
 *G05B 19/406* (2006.01)

(52) U.S. Cl.
 CPC .. *G05B 19/406* (2013.01); *G05B 2219/50193* (2013.01)

(58) Field of Classification Search
 USPC .......................................................... 700/28
 See application file for complete search history.

(56) References Cited

U.S. PATENT DOCUMENTS

| | | | |
|---|---|---|---|
| 2017/0192427 A1* | 7/2017 | Bivans | G05B 19/0421 |
| 2019/0004489 A1* | 1/2019 | Stagg | G05B 19/048 |
| 2019/0056735 A1* | 2/2019 | Koopman | G05D 1/0077 |

* cited by examiner

*Primary Examiner* — Mohammad Ali
*Assistant Examiner* — Joshua T Sanders
(74) *Attorney, Agent, or Firm* — Run8 Patent Group, LLC; Peter Miller; Brian T. Chew

(57) ABSTRACT

Systems and methods for safety-enabled control. Input values provided to a control system can be validated. Command gating can be performed for control values provided by the control system. Validation of input values and command gating for control values can be performed in accordance with respective validation windows. Validation windows can be dynamically adjusted based on data received via a sensor or interface.

20 Claims, 17 Drawing Sheets

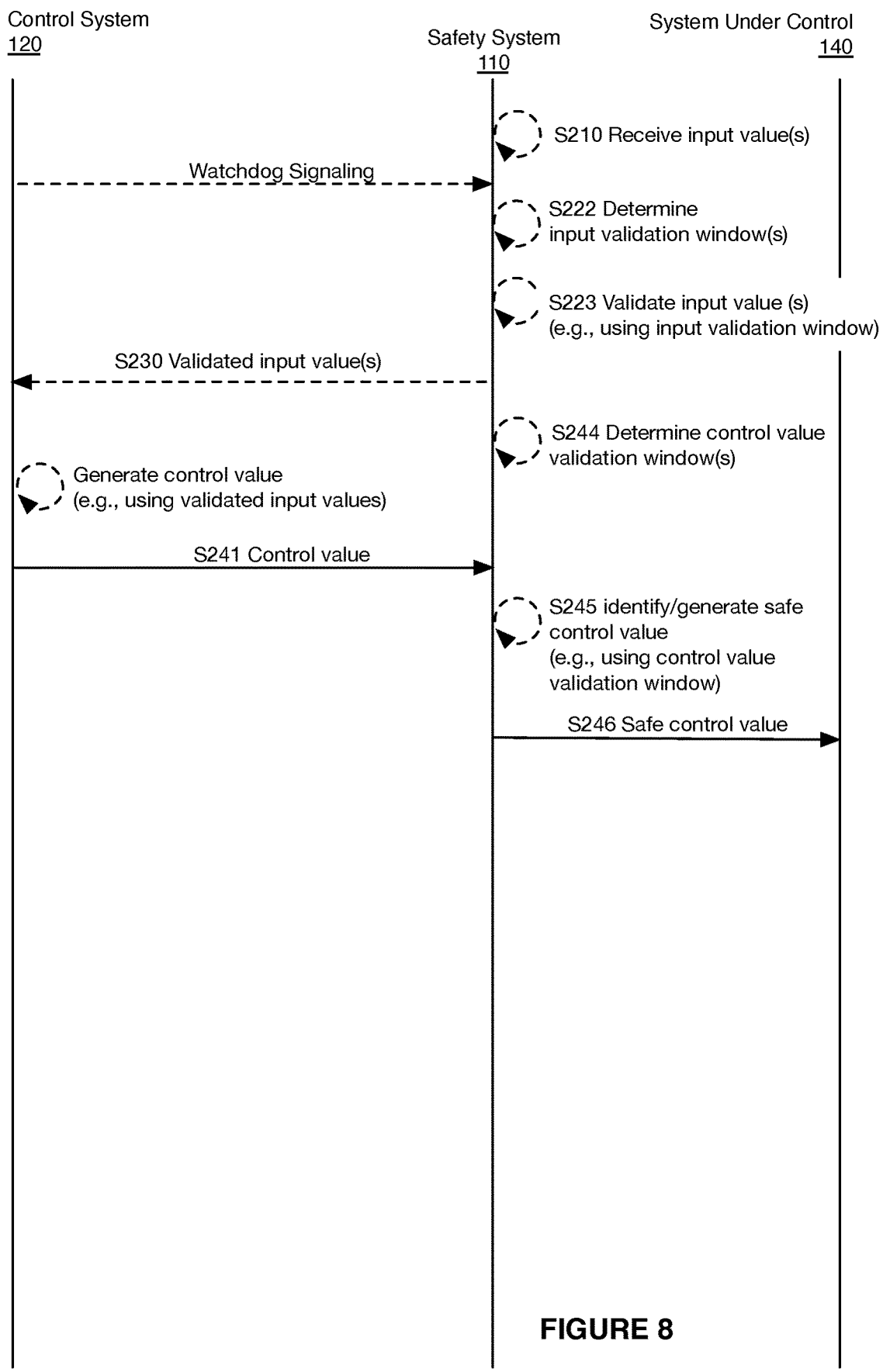

SYSTEMS AND METHODS FOR SAFETY-ENABLED CONTROL

CROSS-REFERENCE TO RELATED APPLICATIONS

This Application is a divisional application of U.S. patent application Ser. No. 16/937,299, filed on 23 Jul. 2020, which claims priority to U.S. Provisional Application No. 62/879,102, filed on 26 Jul. 2019, U.S. Provisional Application No. 62/898,962, filed on 11 Sep. 2019, and U.S. Provisional Application No. 62/985,625, filed on 5 Mar. 2020, each of which are incorporated herein in its entirety by this reference.

TECHNICAL FIELD

This invention relates generally to the system control field, and more specifically to a new and useful system and method in the system control field.

BACKGROUND

Thus, there is a need in the system control field to create an improved control systems and methods. This invention provides such improved control systems and methods.

BRIEF DESCRIPTION OF THE FIGURES

FIG. 8 is a representation of the method, according to various embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Embodiments disclosed herein include systems and methods for safety-enabled control of one or more systems.

The system (e.g., 100) functions to provide safe control values that can be used to control another system or component. In some variations, the system 100 includes at least one of: a safety system (e.g., 110), a control system (e.g., 120), an interface device (e.g., 161, 162), a sensor (e.g., 131, 132), and a system-under-control (e.g., 140).

In some variations, the method includes at least one of: receiving at least one input value (e.g., S210); performing input validation (e.g., S220); providing input values (e.g., S230); and performing command gating (S240). Performing command gating can include passing an initial control value to a system under control, generating a safe control value based on an accessed initial control value, etc. In some variations, providing input values includes providing validated input values to the control system, wherein the control system can use the validated input values to generate control values.

2. Benefits

The embodiments disclosed herein can confer several benefits over conventional systems and methods.

First, by virtue of inserting a safety system in the control path between the control system and the system under control, the system under control can be secured from unsafe control values generated by the control system.

Second, by virtue of segregating the safety system from the control system, the control system can be updated without compromising safety. As a result, the design of the control system can be frequently updated without requiring full safety retesting, or re-certification for safety compliance.

However, further benefits can be realized from the embodiments disclosed herein.

3. System

FIGS. 1A-K are schematic representations of the system, according to embodiments.

Figure 1A:
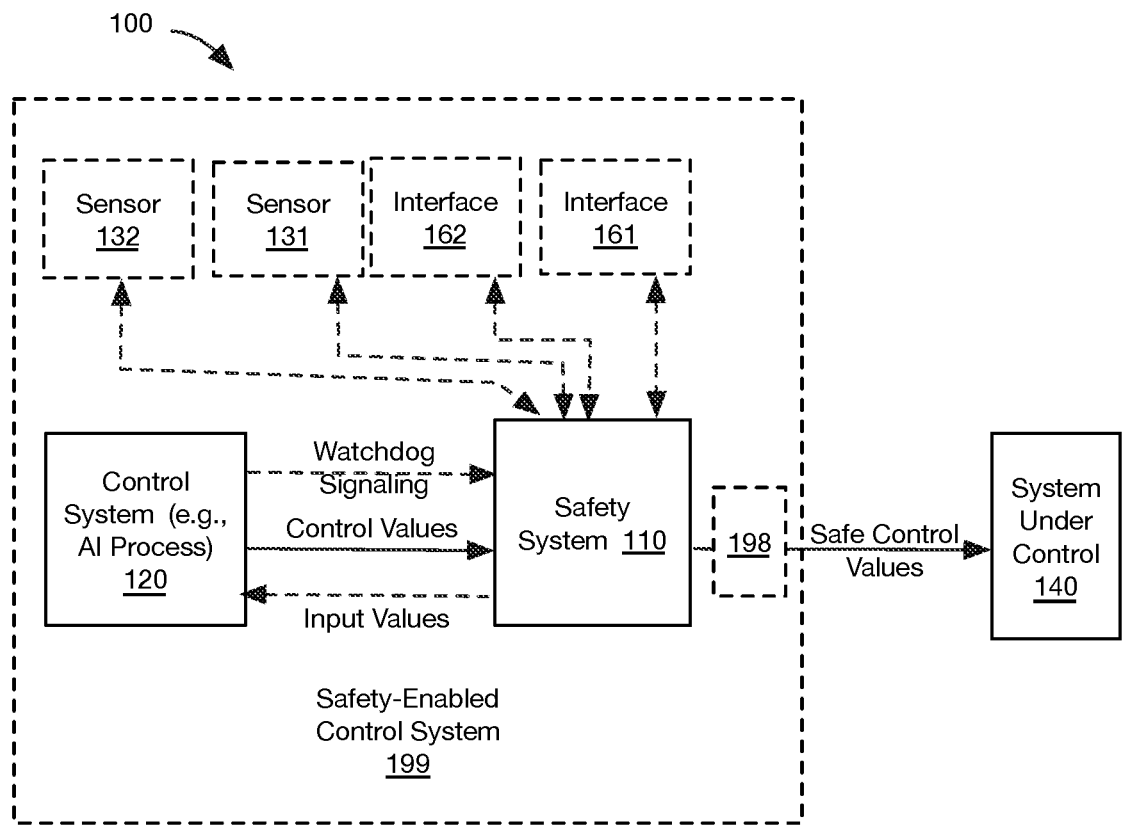
FIGS. 1A-K are schematic representation of the system, according to various embodiments.

In some variations, the system (e.g., 100) functions to provide safe control values that can be used to control a component of the system or another system (e.g., a system under control 140 shown in FIG. 1A). In a first variation, the system is a component of a larger system (e.g., a robot, a vehicle, a drone, an industrial system, a home system, a spaceborne system, etc.) that includes one or more components (e.g., motors, actuators, propulsion systems, etc.) that are controlled by the safety system (e.g., 100). In a second variation, the system is external to such larger systems, and controls one or more such larger systems (e.g., locally or remotely). For example, the system can function to remotely control a drone or autonomous vehicle, or a fleet of drones or autonomous vehicles.

In some variations, the system 100 is one or more of: a robot, a vehicle (e.g., autonomous, semi-autonomous, etc.), an industrial system (e.g., a manufacturing system, a farming system, a construction system, a waste processing system, a power system, a power generator, an environmental control system, a military system, a transportation system, etc.), a home system (e.g., HVAC, home automation, etc.). The system 100 can be a terrestrial system, or a space system (e.g., satellite, spacecraft, missile, space probe, space station, etc.).

The system (e.g., 100) can include a control system (e.g., 120) and a safety system (e.g., 110). In some implementations, the control system and the safety system are included in a safety-enabled control system (e.g., 199 shown in FIG. 1A) that integrates the safety system with the control system (e.g., within a chipset, within an integrated circuit, within a microelectronic device package, within a silicon die, etc.). However, the control system and the safety system can be arranged within the system in any suitable manner (within separate hardware devices, separate chipsets, separate integrated circuits, separate microelectronic device packages, separate silicon die, etc.).

The control system 120 functions to provide control values to the safety system 110, which performs a command gating process to provide safe control values (e.g., original control values determined to be safe, new control values generated by the safety system, etc.) based on the control values received from the control system.

In some variations, the safety system functions to perform an input validation process and provide validated input data to the control system.

The system can optionally include one or more of: an interface device (e.g., 161, 162) and a sensor (e.g., 131, 132). At least one interface device can be coupled to the safety system, such that that safety system can perform the command gating process or the input validation process based on data received via the interface device. Similarly, at least one sensor can be coupled to the safety system, such that that safety system can perform the command gating process or the input validation process based on data received via the sensor.

Example sensors can include one or more of: a speed sensor, radar, steering position sensor, image sensor (e.g., 3D camera, 2D camera, multi-spectral camera, etc.), LIDAR, and the like. However, the system can include (or be coupled to) any suitable type of sensor.

In an example, the system is an integrated circuit (e.g., a chipset) that includes the control system, the safety system, and one or more interface devices (e.g., radios, wired network interface devices, etc.) coupled to the safety system.

Components of the system 100 can be coupled (e.g., communicatively coupled, electrically connected, etc.) in any suitable manner (e.g., via one or more of a bus, backplane, network, Network on a Chip), circuit board, silicon die, substrate, wires, solder, bus, communication link, a set of hardware registers, a communication port, a physical layer network interface, electrical connections, an electrical circuit, and the like.

Components of the system 100 can be arranged in any suitable manner (e.g., within one or more chipsets, within one or more microelectronic device packages, within one or more silicon die, etc.).

Figure 1B:
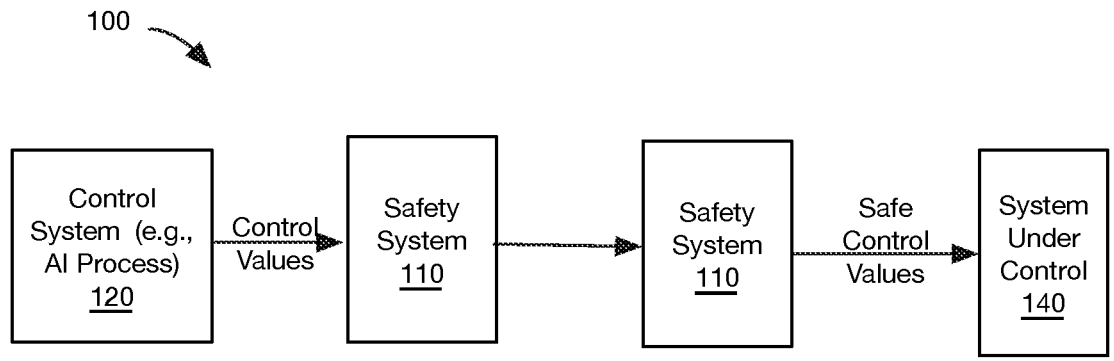
Figure 1C:
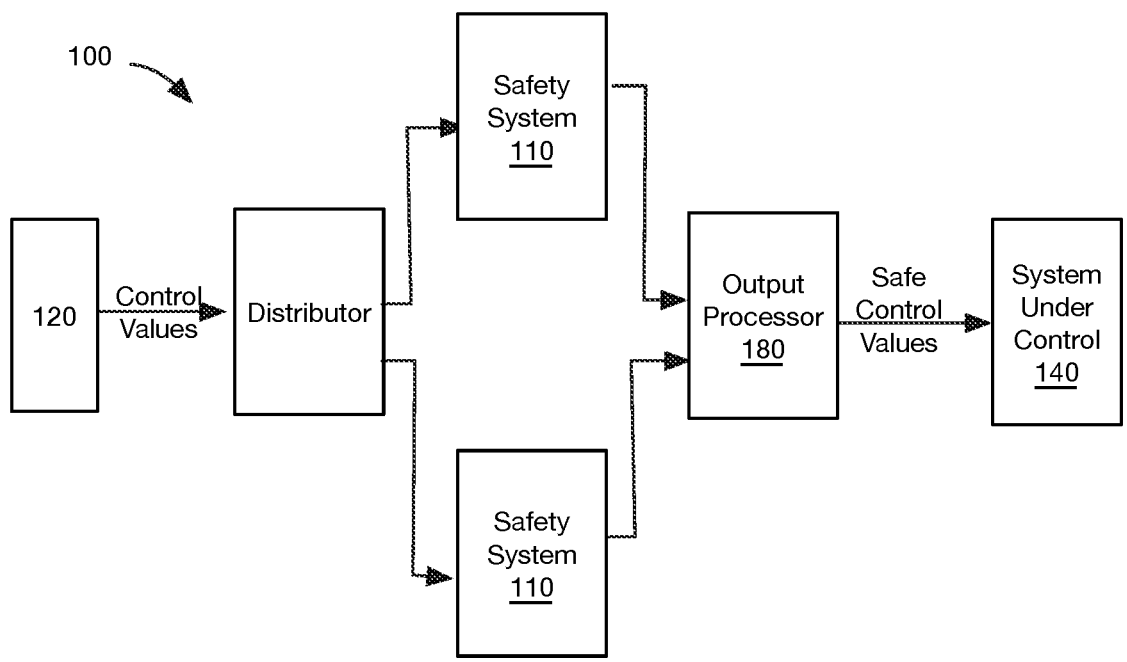
Figure 1D:
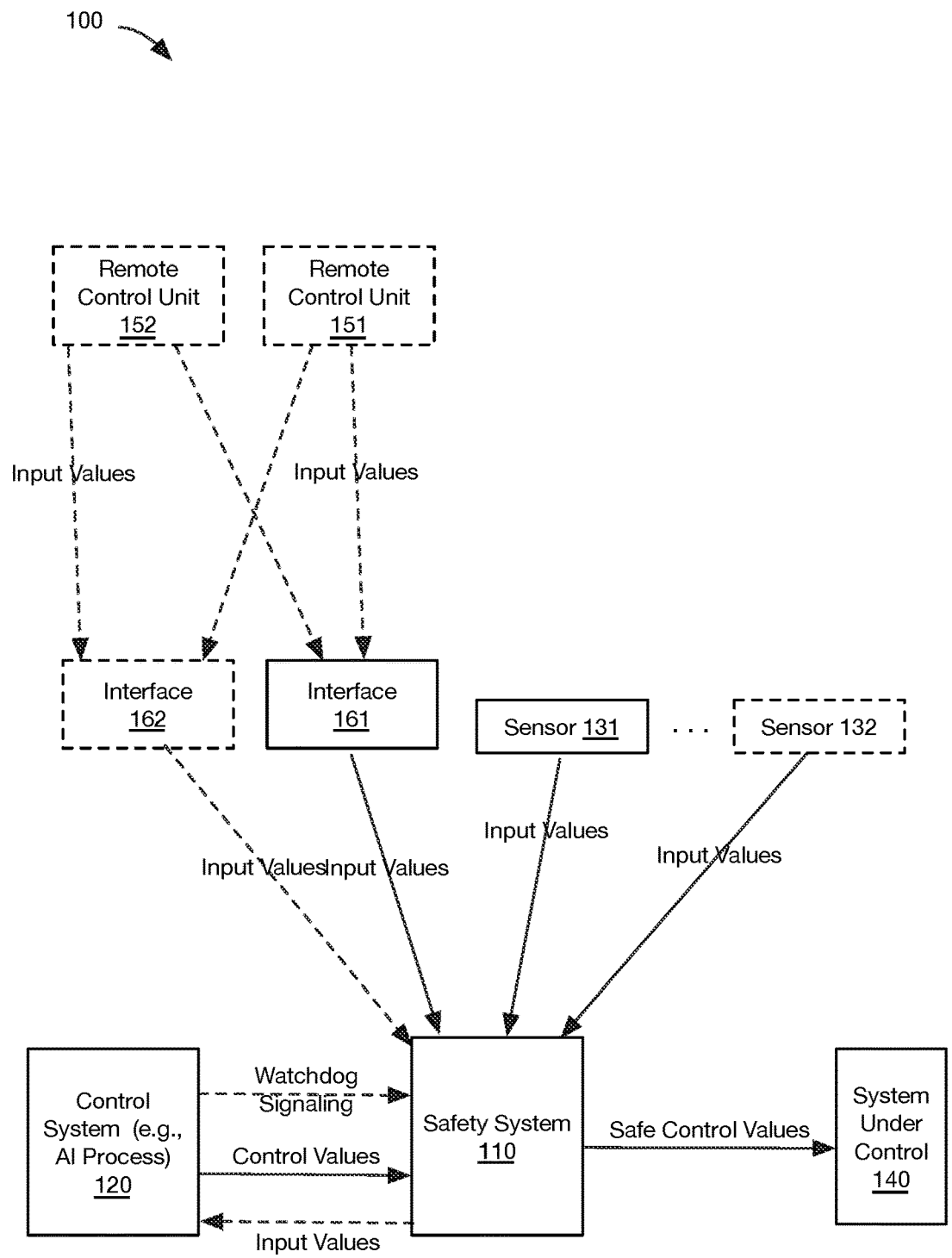
Figure 1E:
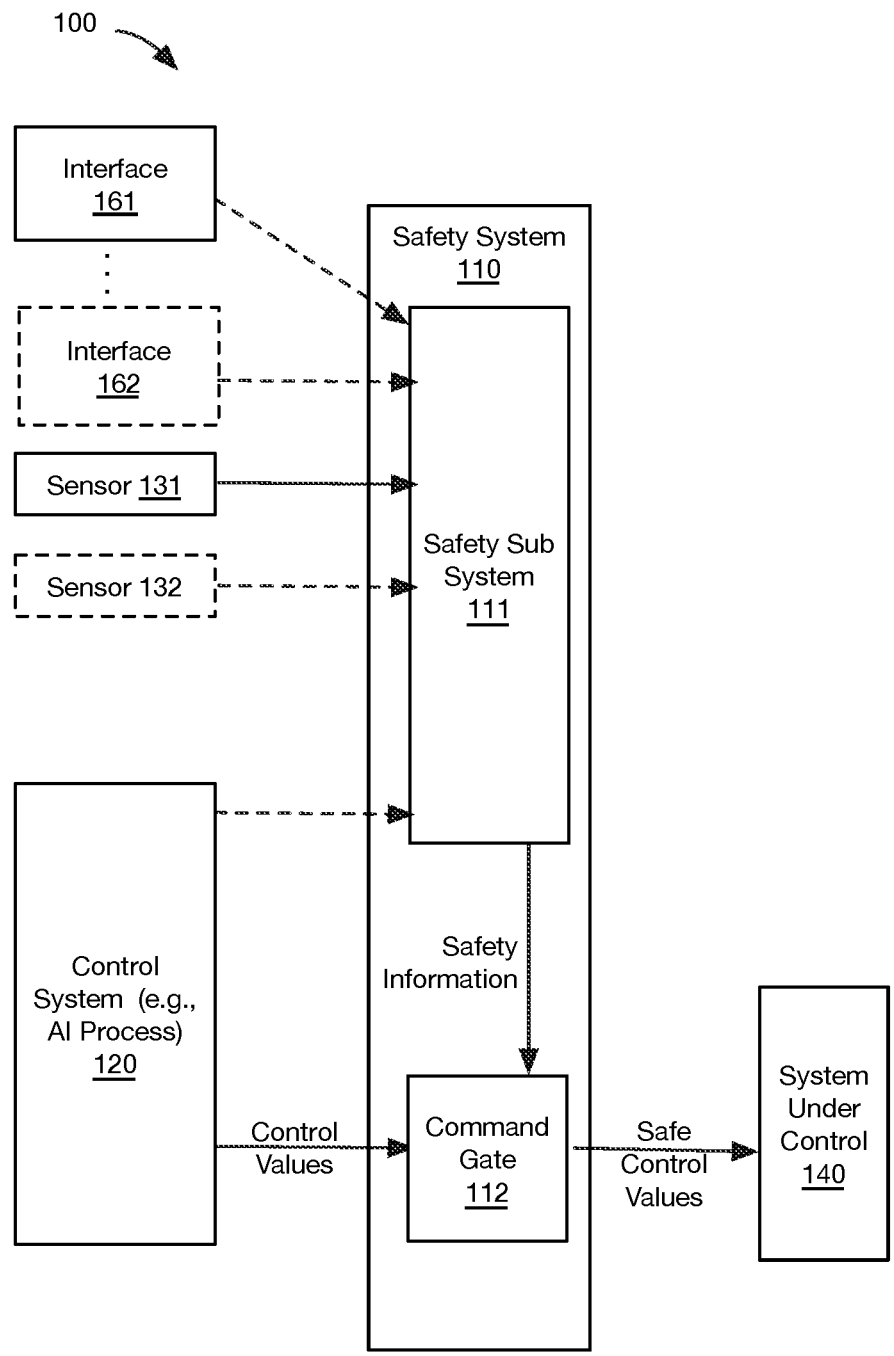
Figure 1F:
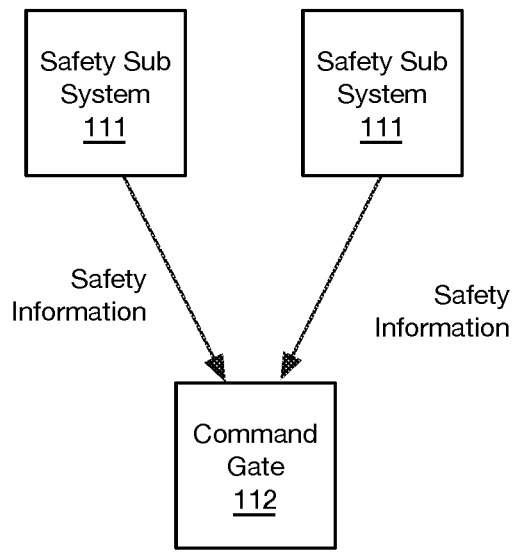
Figure 1G:
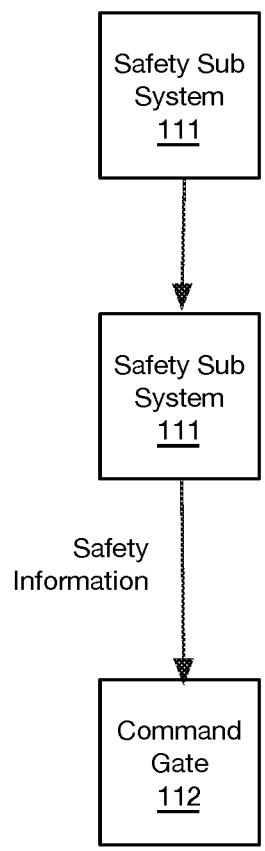
Figure 1H:
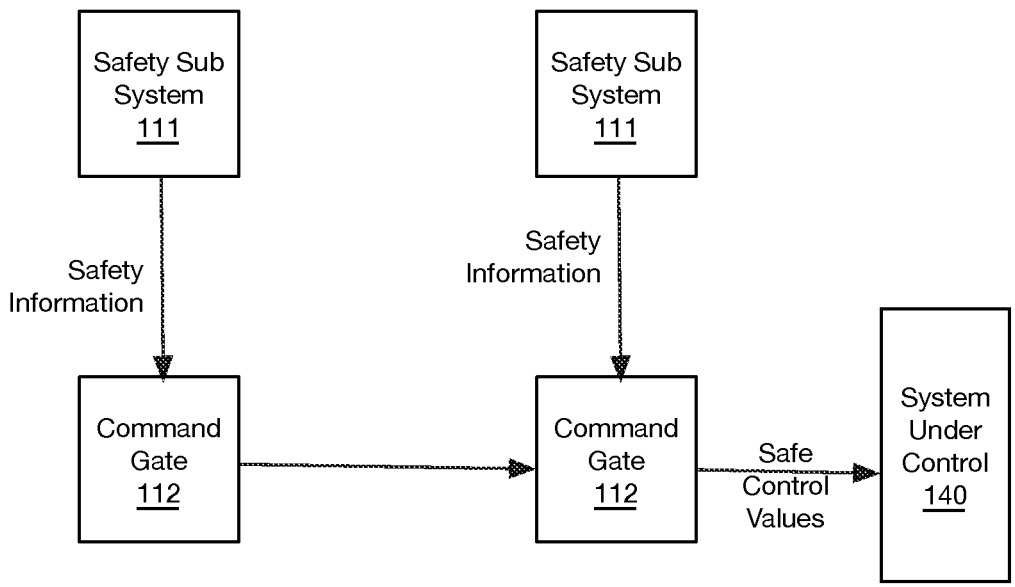
Figure 1I:
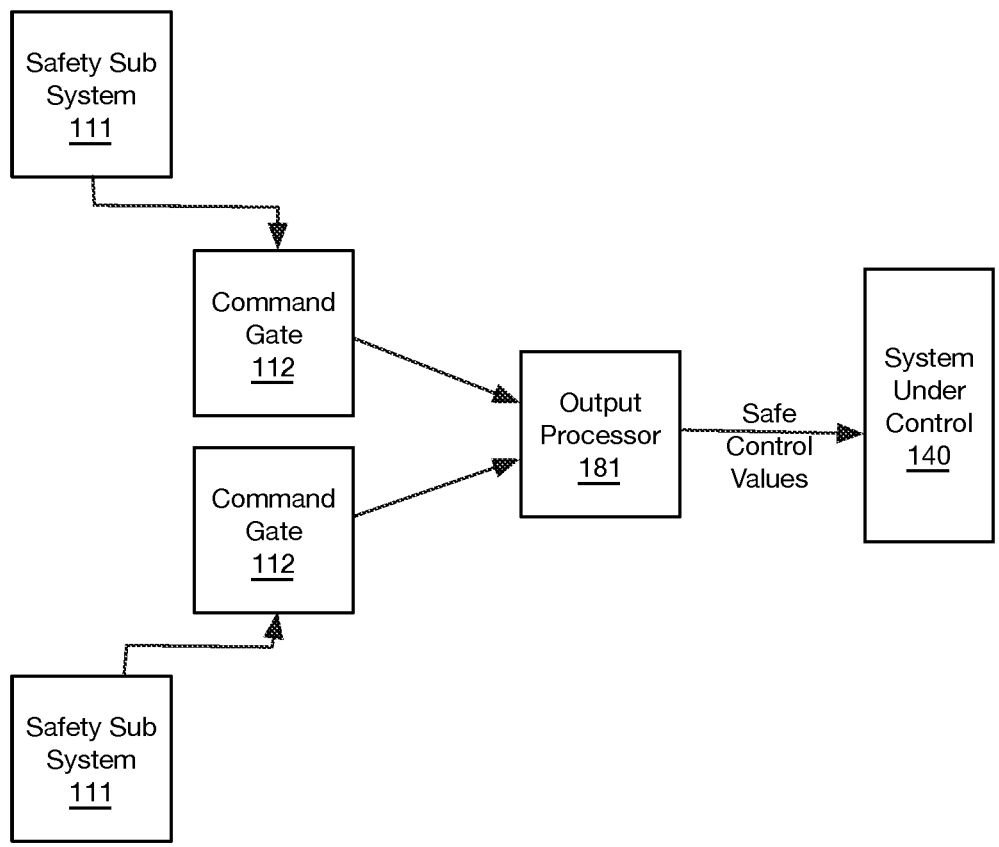
Figure 1J:
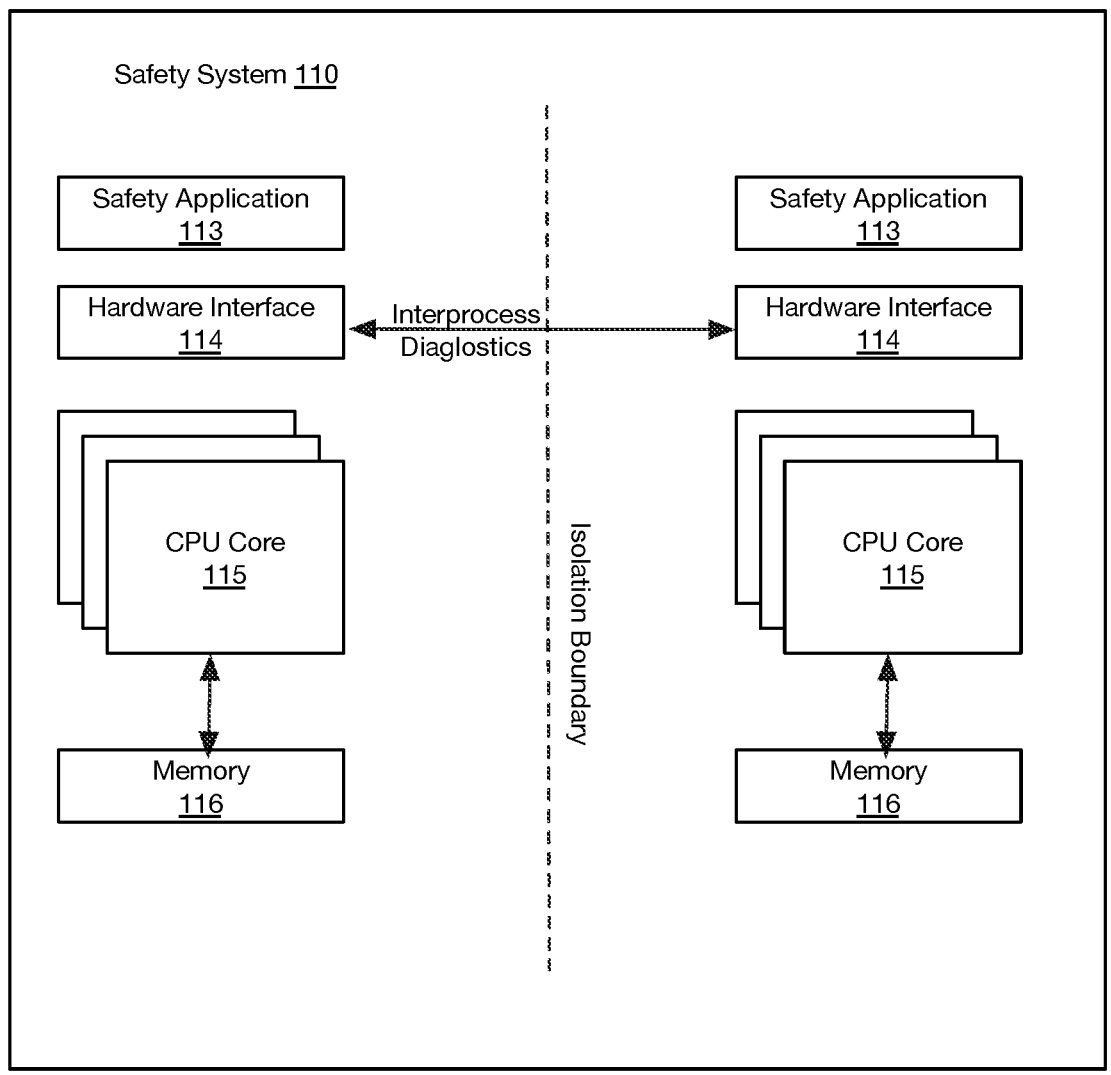
Figure 1K:
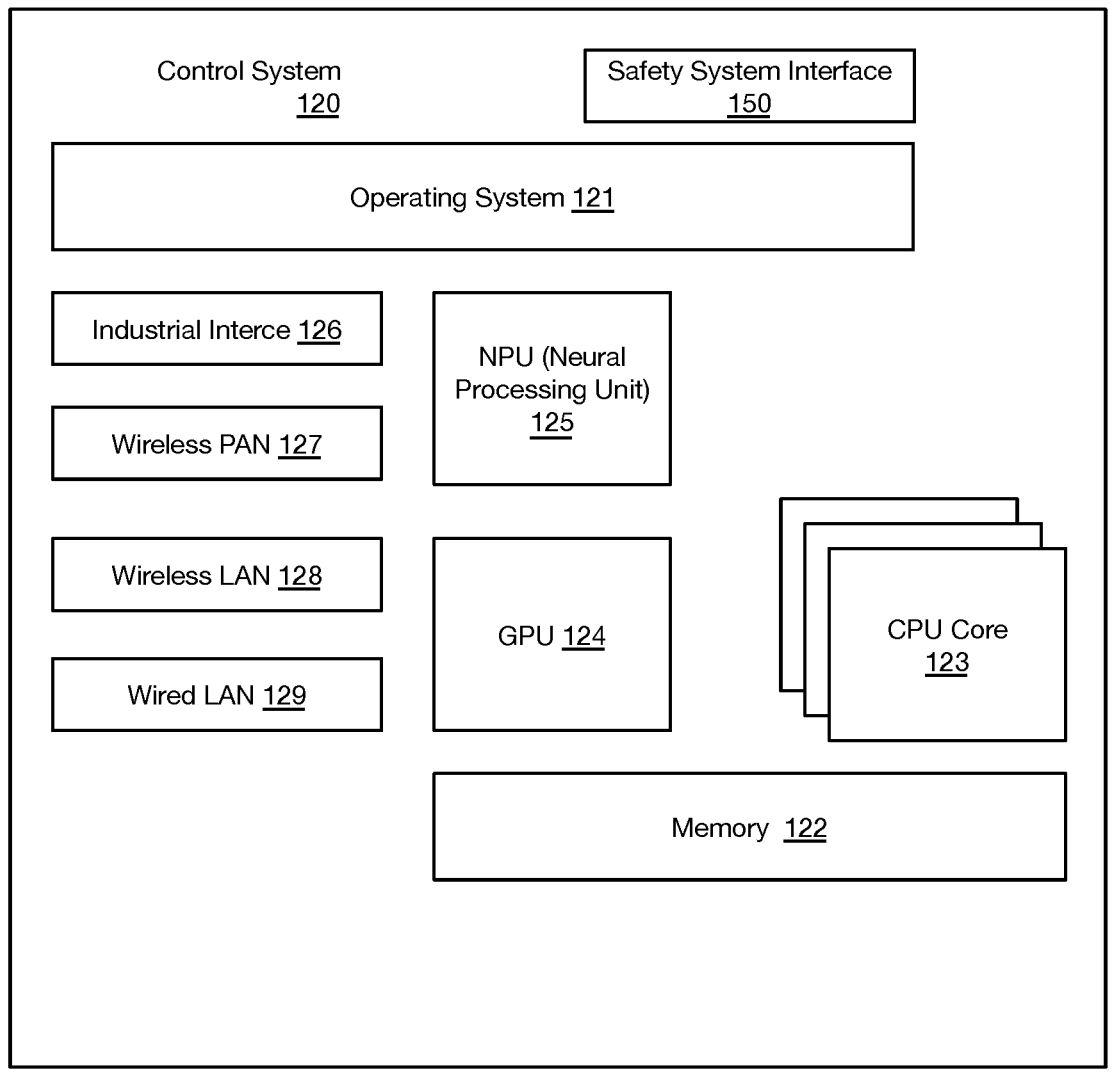
Figure 2A:
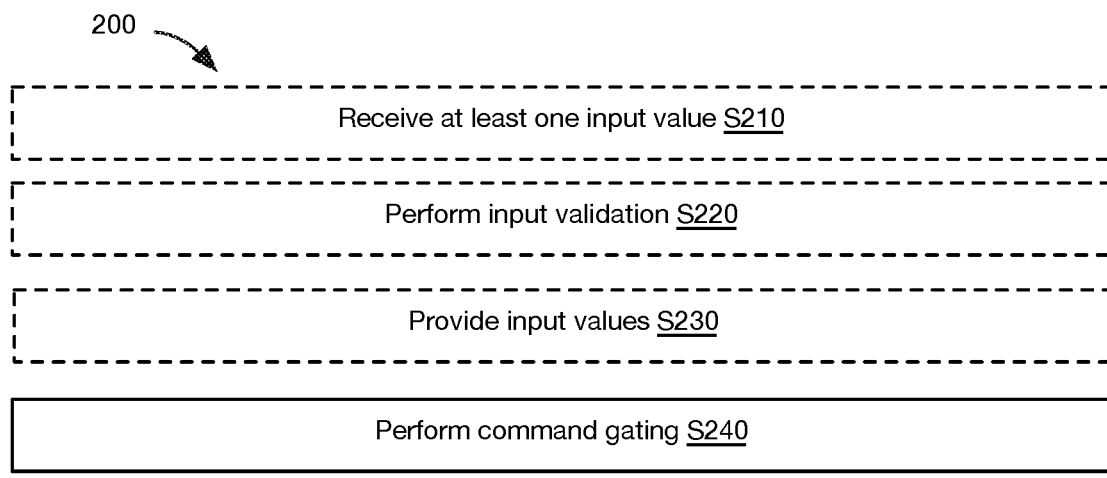
FIGS. 2A-D are representations of the method, according to various embodiments.
Figure 2B:
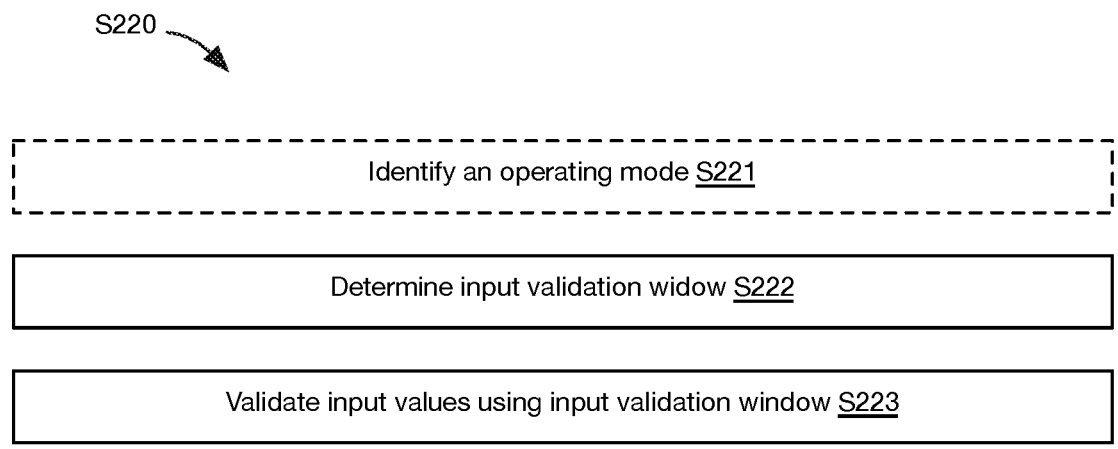
Figure 2C:
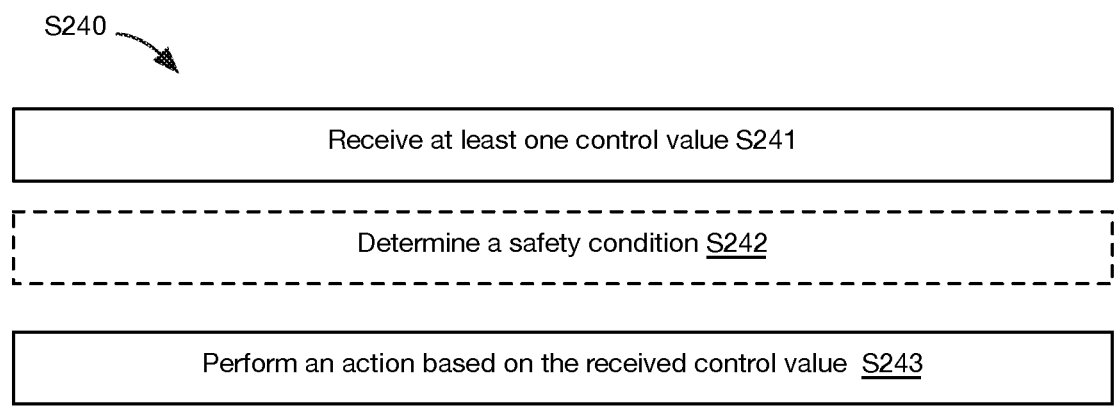
Figure 2D:
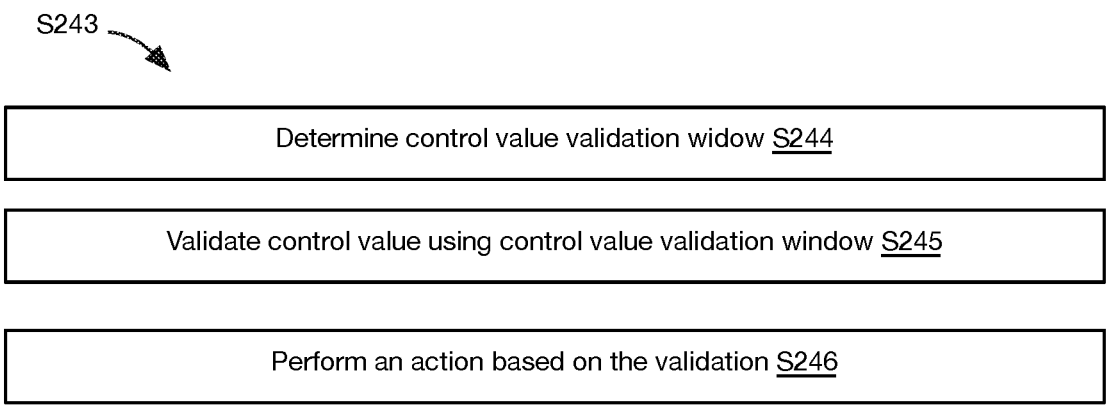

The system 100 can optionally include a safety system interface (e.g., 150 shown in FIG. 1K). In some variations, the safety system interface 150 functions to provide communication between the control system 120 and the safety system 110. In some variations, the safety system interface functions to provide communication between the control system 120 and systems other than the safety system 110 (e.g., non-safety systems, etc.). In some variations, the safety system interface functions to provide communication between the safety system 110 and systems other than the control system 120.

In some variations, the system 100 includes at least one interface device (e.g., 161, 162). In some implementations, the system includes two or more interface devices for communication with an external system. For example, a first interface device can a primary interface device, and a second interface can be a backup interface device. In some variations, at least one interface device included the system 100 is a hardware device. Interface devices can include one or more of a wired interface device (for wired communication) and a wireless interface device (for wireless communication). Interface devices can support one or more protocols, such as, for example, universal serial bus (USB), Bluetooth, Wi-Fi, Ethernet, near field communication (NFC), LTE, ISM (Industrial, Scientific, Medical) and the like. In some implementations, at least one interface device is a radio (e.g., a receiver, transmitter, or transceiver). In some variations, wireless communications interfaces include interfaces for one or more of long range wireless communication, short range wireless communication, wireless communication between terrestrial and spaceborne systems, etc. Example radios include one or more of the following types of radios: WiFi, LTE, Bluetooth, NFC, ISM (Industrial, Scientific, Medical), satellite, shortwave, UHF, VHF, HF. However, interface devices can include any suitable type of radio.

In some implementations, the system includes two or more interface devices for communication with an external system. For example, a first interface device can a primary interface device, and a second interface can be a backup interface device. In some implementations, the system includes one or more of a Wi-Fi radio, an LTE radio, an ISM radio, and a Bluetooth radio.

The system can optionally include at least one system under control 140. Alternatively, the system can be coupled (e.g., communicatively, electrically, etc.) to at least one external system under control 140 (e.g., via a control interface 198 shown in FIG. 1A).

The system-under-control 140 can be a hardware system, a software system, or a combination of hardware and software systems. Examples of the system-under-control 140 include motors, actuators, robots, vehicles (e.g., autonomous, semi-autonomous, etc.), industrial systems (e.g., manufacturing systems, farming systems, construction systems, waste processing systems, power systems, power generators, environmental control systems, military systems, transportation systems, etc.), home systems (e.g., HVAC, home automation, etc.). The system-under-control 140 can be a terrestrial system, or a space system (e.g., satellite, spacecraft, missile, space probe, space station, etc.).

In some variations, the system 100 can be coupled to an external system under control 140 in any suitable manner. In variants, the system 100 is coupled to the system under control 140 via a control interface 198. The control interface include one or more of: a bus, a network, a circuit board, wires, solder, communication link, a communication port, a physical layer network interface, electrical connections, an electrical circuit, and the like. By virtue of separating the control interface from the safety subsystem, design of the safety subsystem can be updated without changing requiring updates to the electrical (or logical) connection between the system 100 and an external system under control 140.

In some implementations, the control interface 198 is included in the safety system 110.

Control values generated by the control system can be signals, data, commands, instructions, messages, or any suitable value that can affect control of the system-under-control 140.

The control system 120 can be an artificial intelligence (AI) control system, a machine-learning-based control system, a deterministic control system, or any suitable type of system that can generate control values. The control system 120 can be a distributed system, a multi-core processor, a single-core processor, a server, a circuit board, a chipset, a network appliance, a system on a chip (SoC), a circuit, a processor core, or any suitable type of hardware system.

As shown in FIG. 1K, in some implementations, the control system 120 can include one or more of an a CPU core 123, a GPU (Graphics Processing Unit) 124, an NPU (Neural Processing Unit) 125, an Operating System 121, an industrial interface 126, a Wireless PAN (Personal Area Network) interface 127, a Wireless LAN interface 128, a Wired LAN interface 129, and a memory 122. In some variations, the control system 120 can include any suitable type of radio transceiver for wireless communications (e.g., long range wireless communication, short range wireless communication, wireless communication between terrestrial and spaceborne systems, etc.).

In some variations, the safety system interface (safety system manager) (e.g., 150 shown in FIG. 1K) functions as an interface between the control system 120 and the safety system 110. In a first variation, the safety system interface 150 is a hardware interface (e.g., a set of hardware registers, a bus, a communication port, a physical layer network interface, electrical connections, an electrical circuit, and the like). In a second variation, the safety system interface 150 is a software interface (e.g., a device driver, an SDK, an API, etc.). In a third variation, the safety system interface 150 is a combination of a hardware interface and a software interface (e.g., a device driver and a corresponding physical communication interface circuit, etc.). However, the safety system interface 150 can be otherwise constructed.

In some variations, the safety system interface 150 communicates with the safety system 110 via one or more of an IP-based (e.g., Ethernet, Wifi, LTE, etc.), or non-IP (e.g., Bluetooth/BLE, proprietary ISM, etc.) interface. In some variations, the safety system interface 150 includes an interface for loading/managing safety processor firmware images, passing configuration to safety processors (e.g., 115 shown in FIG. 1J), routing safety specific messaging to/from safety applications (safety cores) (e.g., 113 shown in FIG. 1J). However, the safety system interface 150 can perform any other suitable functionality for interfacing with the safety system 110. In some variations, the safety system interface 150 communicates with the safety system 110 via one or more of a bus, a backplane, and an electrical connection. However, the safety system interface 150 can communicate with the safety system 110 in any suitable manner.

In some variations, the safety system 110 functions to prevent unsafe control values from reaching the system-under-control 140 from the control system 120.

In some variations, the safety system 110 (e.g., a command gate 112 of the safety system 110) is coupled (e.g., communicatively, electrically) to a system under control (e.g., via a control interface 198 shown in FIG. 1A). In some implementations, the safety system 110 is interposed between the control system 120 and a control interface 198 that functions to couple the system (e.g., 199) to the system under control 140. In some implementations, the control interface 198 couples the system (e.g., 199) to the system under control 140 such that the system under control 140 only receives control values (safe control values) from the safety system, and cannot receive control values directly from the control system (that are not first processed by the safety system).

In some variations, the safety system 110 is coupled (e.g., communicatively, electrically) to one or more input sources (e.g., remote control units 151, sensors 131, the control system 120, robots, vehicles, industrial systems, databases, web sites, information sources, news sources, traffic controllers, another system-under-control, or any other suitable input source), and uses input values received from at least one input source to determine a safety condition and optionally related safety information (e.g., safe and unsafe control values, an enable signal, etc.). The safety system 110 can be communicatively coupled to one or more input sources via an interface device (e.g., 162, 161). Input values can represent one or more of: an e-stop value, a speed, a radar value, a steering position, an operating mode, output from a 3D camera, output from a 2D camera, LIDAR data, auxiliary sensor data (such as from, e.g., a backup LIDAR, etc.), safety information from external systems, and any suitable type of information.

In some variations, input values can represent information provided by the control system 120, such as, for example, one or more of: a watchdog signal, a requested speed, a requested steering value, or any other suitable type of command or information provided by the control system.

The safety system no can include one or more of a machine learning model, a neural network, a rules engine, a rule set, a table, a database, etc. for determining the safety condition or safety information.

In some variations, redundancy and/or resiliency is provided by using a plurality of safety systems (e.g., 110). The system 100 can include a plurality of safety systems 110 that collectively function to prevent unsafe control values from reaching the system-under-control 140 from the control system 120. The plurality of safety systems can be isolated from each other. For example, the plural safety systems can be separate circuits, separate processors, separate processes running on separate processing cores, separate processes running in separate containers, etc.

In a first example, safety systems can be configured in series (e.g., as shown in FIG. 1B) such that an output (control value) of a first safety system is provided as an input to a second safety system that performs redundant (or additional) safety checks. In a second example, safety systems can be configured in parallel (e.g., as shown in FIG. 1C) such that outputs (control values) of each safety system are used to determine a safe control value to be sent to the system-under-control 140. For example, a voting algorithm can be applied to the outputs of the safety systems (e.g., by using an output processor 180 shown in FIG. 1C) to determine the safe control value to be sent. However, safe control values can be otherwise determined by using outputs from one or more safety systems 110.

The safety system no can be an artificial intelligence (AI) safety system, a deterministic safety system, a rules-based safety system, or any suitable type of system that can block, filter, discard, or transform control values received from the control system 120. In some variations, the safety system is a deterministic safety system that has been tested, and certified by a safety certification authority (e.g., TUV (Technischer Überwachungsverein), Underwriters Laboratories) in accordance with standards set by a standards commission (e.g., the International Electromechanical Commission). In some variations, the safety system 110 can be a distributed system, a multi-core processor, a single-core processor, a server, a circuit board, a chipset, a network appliance, a system on a chip (SoC), or any suitable type of hardware system. In some variations, the safety system 110 is a module (that includes machine executable program instructions) executed by at least one processing core of a multi-core processor that also executes machine executable program instructions of the control system 120.

The safety system no can include at least one command gate 112 (e.g., shown in FIGS. 1E-I). In some variations, the command gate 112 functions to receive control values from the control system 120, block unsafe control values (or transform unsafe control values into safe control values), and send safe control values to the system-under-control 140.

Optionally, the safety system no can include at least one safety subsystem in (e.g., shown in FIGS. 1E-I). In some variations, the safety subsystem 111 functions to receive the input values from the one or more input sources, determine the safety information, and provide the safety information to the command gate 112 based on the received input values. The safety subsystem 111 can receive input values via a wired or wireless interface. In some variations, the safety subsystem 111 receives input values via an interface device 161, 162.

The safety information (e.g., determined by a safety subsystem 1n) can include one or more of: unsafe command values, unsafe command value ranges, command value transformation rules (or instructions), command gating rules, command gating instructions, or any other suitable type of information that can be used by a command gate 112 to perform command gate functionality.

The safety system 110 can include any number of command gates 112 and safety subsystems 111 in any suitable type of arrangement (e.g., as shown in FIGS. 1F-I). In some variations, a command gate receives safety information from a plurality of safety subsystems (e.g., as shown in FIG. 1F). In some variations, safety subsystems in can be connected in series (e.g., as shown in FIG. 1G). For example, two safety subsystems can be arranged such that an output of a first safety subsystem is used as an input by a second safety subsystem, and the output of the second safety subsystem is passed to the command gate as safety information. In some variations, command gates 112 can be connected in series (e.g., as shown in FIG. 1H). For example, two command gates can be arranged such that an output of a first command gate is used as an input by a second command gate, and the output of the second command gate is passed to the system-under-control 140 as a safe control value. In some variations, command gates 112 can be connected in parallel (e.g., as shown in FIG. 1I). For example, an output processor 181 can combine safe control values received from two command gates to determine a final safe control value to be provided to the system under control.

In some variations, the system 100 includes the safety system 110, the control system 120, and at least one interface device (161, 162). The safety system 110 includes at least a first command gate 112 and a first safety subsystem 111. The first command gate 112 includes a safe control value output (which can be electrically coupled to a motor or actuator). The safety subsystem 111 includes a safety information output that is electrically coupled to a first input of the first command gate 112. The control system 120 includes a signaling output (e.g., a watchdog signaling output) that is electrically coupled to a first input of the first safety subsystem 111. The control system 120 also includes a control value output that is electrically coupled to a second input of the command gate 120. At least one interface device (e.g., 161, 162) is coupled (e.g., electrically, communicatively) to at least a second input of the safety subsystem 111. In some implementations, at least one interface device (e.g., 161, 162) is coupled to at least a second input of the safety subsystem 111 via one or more of a bus, backplane, network, Network on a Chip), circuit board, silicon die, substrate, wires, solder, bus, communication link, a set of hardware registers, a communication port, a physical layer network interface, electrical connections, an electrical circuit. However, interface devices can be coupled to safety subsystems in any suitable manner, using any suitable hardware components.

In some variations, the safety system 110 (or at least one component of the safety system, e.g., a safety subsystem 111, a command gate 112, etc.) is a safety rated system that is rated by a safety certification authority (e.g., the International Electromechanical Commission).

In some variations, the safety system 110 (or at least one component of the safety system, e.g., a safety subsystem 111, a command gate 112, etc.) is a hardcoded system whose functionality cannot be programmatically modified.

In some variations, the safety system 110 (or at least one component of the safety system, e.g., a safety subsystem 111, a command gate 112, etc.) includes at least one processor (e.g., a hardware processor, a virtual processor running on a shared processor core, etc.) (e.g., as shown in FIG. 1J). One or more of the safety system processors (e.g., 115) can be isolated or secured from the control system 120 by using dedicated (and optionally secured) system resources (e.g., memory locations 116, storage locations, hardware registers, busses, etc.). Such processors can be secured from executing malicious or invalid instructions (or accessing malicious or invalid data) from external systems by using one or more of a secure storage location, a secure memory 116, digitally signed program instructions, encryption, and the like. In this manner, operation of the safety system no can be secured from un-tested (or unverified) code running on the control system 120.

In some variations, at least one processor (e.g., 115) of the safety system 110 is constructed to load program instructions from a secure storage location into a secure memory location (e.g., 116) and execute the program instructions loaded into the secure memory location. In some implementations, the secure storage location is secured from access by external systems, such as the control system 120, such that the external systems cannot alter or add program instructions to the secure storage location. The secure storage location can be an EEPROM, a ROM, a circuit, a persistent storage device, etc.

In some variations, the safety system processor (e.g., 115) can load digitally signed instructions from an un-secured storage location, verify that the instructions have been signed by a valid signer, and upon verification, execute the instructions. In this manner, program instructions provided by external systems, that are not signed with a valid signature, are not executed by the safety system.

In some variations, (as shown in FIG. 1J) the safety system 110 includes a at least one safety application 113 and a corresponding hardware interface (safety library) 114 that interfaces the safety application with one or more processing cores 115. The processing cores 115 can be coupled to a dedicated memory 116. The safety system 110 can include several independent safety applications, having isolated hardware interfaces, CPU cores and memory. The safety applications can communicate with each other via the respective hardware interfaces to perform inter-process diagnostics.

The safety application (safety core) 113 can perform functionality of the safety system 110 as described herein. In some variations, the safety application can implement one or more of: input validation (for input received from input sources), and data and event logging with programmable triggers for high density recording (e.g., logging of input values, watchdog signaling values, control values, safe control values, etc.).

In some variations, the hardware interface 114 can function to perform diagnostics and testing of hardware specific fault cases. In some implementations, the hardware interface 114 is firmware specifically designed to allow a processor (e.g., 115) not specifically designed for functional safety to achieve high SIL (Safety Integrity Level). In some implementations, the hardware interface 114 functions to detect hard or soft faults. In some implementations, the hardware interface includes an interface for communication with redundant safety applications 113 (e.g., as shown in FIG. 1J), as well as communications to systems external to the safety system 110. In some implementations, the hardware interface 114 includes modules to perform one or more of the following: internal bus structure tests; inter-process communication; I/O register tests; memory register tests; memory startup bit tests; memory hardware error monitoring; periodic CRC scanning for memory; CPU core timebase tests; CPU process sequence and timing monitoring; CPU core tests; CPU register tests, and the like. However, the hardware interface 114 can perform any suitable type of safety test.

In some variations, the output of the control system 120 is hardcoded to an input of the safety system 110 such that the control system 120 cannot be altered, reprogrammed, or reconfigured to provide control values directly to the system-under-control 140. For example, an operating system (e.g., 121), the safety system interface 150, firmware, device driver, etc. of the control system 120 can automatically route control values to the safety system 110 regardless of the application code being executed by the control system 120. In some variations, the output of the control system 120 is hardwired to an input of the safety system 110 such that no electrical connection or network can couple a control value output from the control system 120 to the system-under-control 140. For example, a control system output (of the control system 120) that provides control values can be electrically coupled directly to the safety system 110, such that there is no electrical connection to the control system output that will permit control values from reaching the system-under-control 140 without first passing through the safety system 110. In this manner, command gating for control values of the control system 120 can be provided, regardless of the operation of the control system 120, such that unsafe control values generated by the control system 120 must pass through the safety system 110.

In some variations, at least one component of the system performs at least a portion of the method.

4. Method

FIGS. 2A-D and 8 are a representations of the method, in accordance with various embodiments. In some variations, the method 200 includes at least one of: receiving at least one input value S210; performing input validation S220; providing input values S230; and performing command gating S240.

In some variations, the safety system performs at least a portion of one or more of S210, S220, and S230. In some implementations, a safety sub system (e.g., 110) performs at least a portion of one of S210, S220, and S230. In some implementations, a command gate (e.g., 112) performs at least a portion of S230.

Receiving at least one input value S210 can include the safety system 110 receiving at least one input value from at least one input source (e.g., 131, 132, 151, 152 shown in FIG. 1D). In some variations, the safety system 110 receives input values via one or more interface devices 161, 162.

Performing input validation S220 can include one or more of: identifying an operating mode S221; determining at least one input validation window S222; and validating received input values by using at least one input validation window S223.

Identifying an operating mode S221 can include identifying an operating mode of the system under control 140 (e.g., by using the safety system 110, a safety subsystem 111, etc.). Additionally, or alternatively, the operating mode can be an operating mode of a system that includes the safety system 110 and/or one or more sensors 131, 132.

In some variations, one or more interface devices (e.g., 161, 162) used by the safety system provide one or one or more communication links for communication of data with another system (e.g., a remote control system operated by a human operator, a remote automatic control system, a remote semi-automatic control system, etc.), and information related to the communication links can be used to identify an operating mode of the system under control.

In some variations, the operating mode is identified by using one or more of: information related to at least one communication link, input values received from at least one input source (e.g., at S210), information related to the system under control (e.g., 140), information related to the control system 120, and information related to the safety system 110.

Information related to a communication link can include one or more of: link monitoring information for the communication link; generated metrics that are generated by using link monitoring information for the communication link; operator information related to the communication link; typical average message error rate; typical average message latency; data characteristics (e.g., characteristics common to all data, characteristics specific to a data class, etc.) for data communicated using the communication link; characteristics and/or parameters of the interface device (or devices) used for the communication link.

In some implementations, link monitoring information is generated during monitoring of one or more communication links provided one or more interface devices (e.g., 161, 162) used by the safety system. The link monitoring information can be generated by the safety system 110, or received via an interface device (e.g., 161, 162) from another system that generates the link monitoring information. In some implementations, the link monitoring information includes link metrics. In some variations, link metrics include one or more of: link status (e.g., connected, disconnected, transmitting data, receiving data, etc.), link quality, link state, link health, signal strength (e.g., RSSI), data classes being received, data classes being transmitted, recent average message error rate, recent average message latency, current message power efficiency (e.g., how much power is consumed to deliver a message), current message monetary cost, and current link monetary cost. However, link metrics can include any suitable metrics for a communication link.

Data characteristics can include one or more of: minimum link quality, minimum link health, minimum signal strength (e.g., RSSI), maximum recent average message error rate, maximum recent average message latency, minimum bandwidth, maximum current message power usage (e.g., how much power is consumed to deliver a message), maximum current message monetary cost, and maximum current link monetary cost. However, data characteristics can include any suitable characteristics.

Information related to the system under control (e.g., 140) can include one or more of: system configuration; system state; and historical data.

Information related to the control system 120, can include information received from an output (e.g., a watchdog signaling output) of the control system 120. In some implementations, information related to the control system 120 can identify health, diagnostic results, test results, and the like, for the control system 120.

Information related to the safety system 110 can include diagnostic and test results generated for the safety system 110 (e.g., by the hardware interface 114).

Operator information can include skill level, experience, training, certification, operation history, etc. of the operator.

In some variations, an operating mode identifies functionality that is currently enabled. For example, the system under control can operate in a normal mode with full functionality, or in one or more degraded modes with limited functionality. In some variations, the operating mode identifies a human operator that has the ability to operate the system under control 140. In some variations, operating modes can be identified based on skill level, experience, training, certification, operation history, etc. of the current operator.

Determining at least one input validation window S222 can include determining an input validation window (e.g., shown in FIG. 3) for one or more input sources (or a group of input sources). Determining an input validation window for an input source can include selecting a predefined input validation window that is associated with one or more of the operating mode identified at S221, characteristics of the input source, and location of the input source (e.g., on the system under control 140, on another system, etc.).

In some variations, input validation windows define boundaries for incoming input data (e.g., sensor data, etc.). Input validation windows can be global applying to all input from all input sources) or defined for individual input sources, categories of input sources, input sources at specific locations (e.g., geographical, or within a system under control, etc.), different operating modes, etc.

In some implementations, several input validation windows are defined for at least one input source. In an example, for at least one input source, an input validation window is defined for each of a plurality of operating modes. In some implementations, a predefined input validation window associated with an input source is selected (at S222) based on the operating mode (e.g., identified at S221). In some variations, a current input validation window (e.g., for an input source, a group of input sources, etc.) is modified (at S222) based on changes to the operating mode. Modifying an input validation window can include one or more of: modifying the boundary values for the input validation window, decreasing the input validation window, and increasing the input validation window.

In some variations, at least one operating mode is associated with a respective safety risk, and transition to an operating mode with an increased safety risk can trigger a decrease in the input validation window. Similarly, transition to an operating mode with a decreased safety risk can trigger an increase in the input validation window. As an example, the input validation window can be decreased if performance of the active communication link for the safety critical data decreases, as identified by the operating mode.

However, the input validation window can otherwise be determined or updated.

Input validation windows can identify actions to be performed based on a received input value.

Input validation windows can be stored (or hardcoded) by the safety system 110, or stored by an external system. In some variations, input validation windows can be configured (e.g., by the control system 120, an operator of the control system 120, the system under control 140, an operator of the system under control 140, etc.).

In some variations, input validation windows are defined by performing dataflow characterization in which input values received by the control system 120 and corresponding control values generated by the control system 120 are collected and analyzed to determine boundaries for input values provided by one or more input sources. Dataflow characterization for input validation windows can be performed during system development, after deployment, or at any suitable time. In some implementations, dataflow characterization includes collecting sensor data (e.g., from sensors 131, 132) and autonomy command data (e.g., from the control system 120) flowing throughout an autonomous system (e.g., an autonomous vehicle controlled by the control system 120) and analyzing that data to determine the critical bounds of this data. These bounds can then be used to window the operation of the system (both in filtering input sensor data as well as windowing autonomy commands). This technique can be used during system development to establish the bounds of critical sensor and autonomy parameters experimentally or to validate critical parameters established analytically. It can also be employed after deployment to continually improve the safety system 110 with data gathered from the field. This is particularly well suited to meet the regulatory requirements of IEC 61508, as continual improvement safety systems is mandated.

Figure 3:
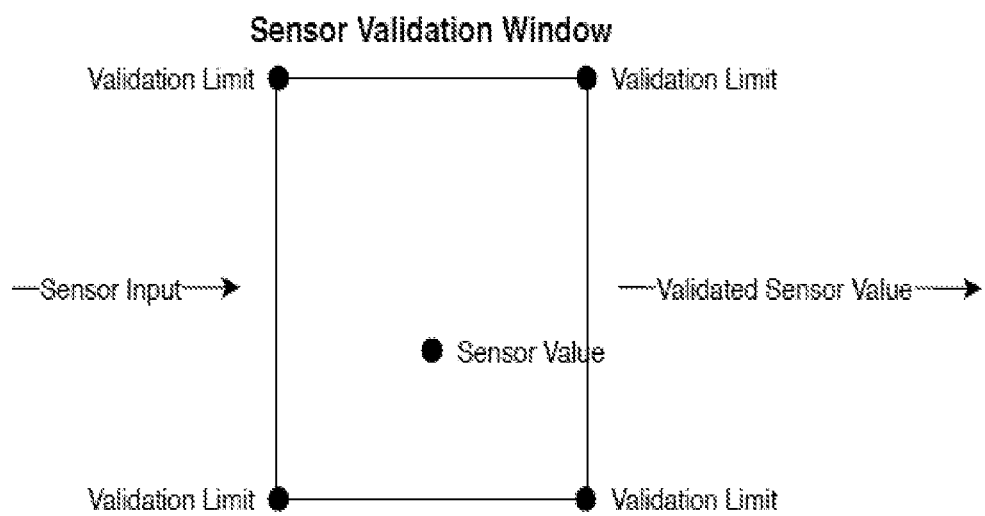
FIGS. 3-7 are representations of validation windows, according to various embodiments.

FIG. 3 shows an exemplary input validation window for a sensor. Input validation windows define boundaries for input values provided by the sensor. The sensor validation window can establish boundaries for incoming sensor data based on sensor characteristic, sensor location (e.g., on the system under control), operating mode of the system under control, etc.

Figure 6:
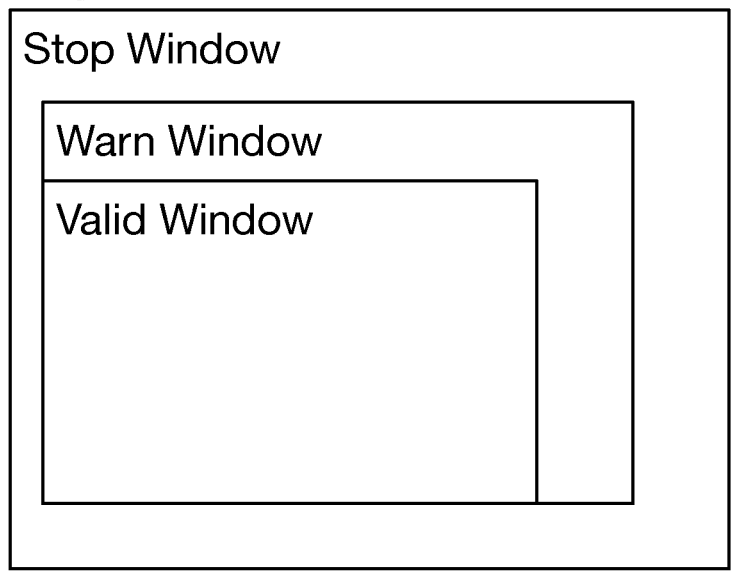
Figure 7:
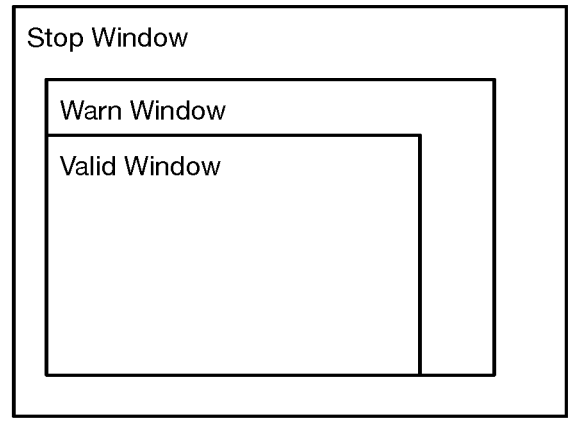
Figure 7:
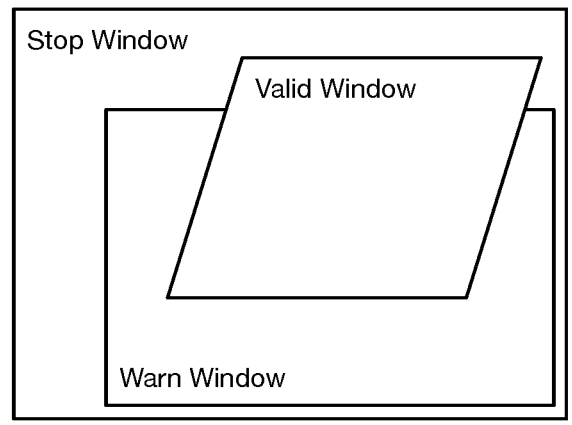
Figure 7:
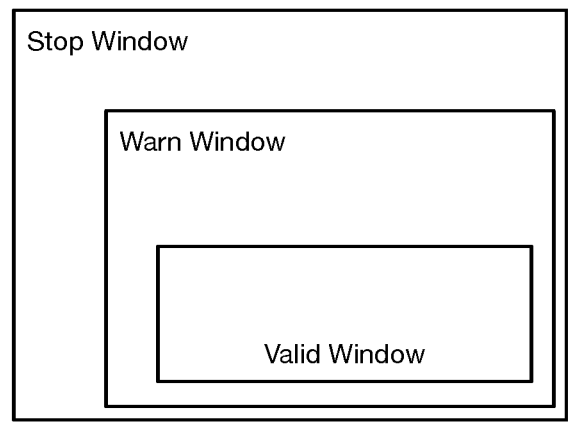

The input validation window can be layered (e.g., shown in FIGS. 6 and 7), including a set of one or more window layers (e.g., "valid", "warn", "stop", etc.). A different action can be associated with each window layer.

As an example, a first input validation window (e.g., for an input source, or a group of input sources), can include a valid window layer with a first input boundary, a warning window layer with a second input boundary, and a stop window layer with a third input boundary. The valid window layer has a first action (e.g., pass the value to the control system 120), the warning window layer has a second action (e.g., send a warning to the control system 120), and the stop window layer has a third action (e.g., stop the system under control, send a safe control value to the system under control, etc.). However, windows can be otherwise used.

Input validation windows determined at S222 can be used to perform input value validation at S223.

In some variations, validating input values using at least one input validation window S223 includes the safety system 110 validating at least one received input value (e.g., received at S210). Validating an input value using an input validation window can include determining if a received input value is included within the input validation window. If the input value is included within the input validation window, then the action associated with the input validation window is identified, and the action for the input value is performed.

If the input value is included within more than one layer of the input validation window, then the action associated with the most restrictive layer is identified, and the action for the input value is performed.

Exemplary input validation actions can include: providing the input value to the control system 120; transforming the input value into a windowed value (e.g., by using a transformation, mapping, process, etc., associated with the window); discarding the input value; sending a notification to one or more of the control system 120 and the system under control 140; logging the input value (e.g., by identifying one or more of the input value, the input source, a time, etc.). However, any suitable action can be performed based on a received input value.

Validating an input value at S223 can include validating an input source that provides the input value, by using at least one redundant input source. In some implementations, the safety system 110 receives the same type of input value from two or more input sources of the same type (each input source having similar, different, or identical characteristics). A first input source can be a main input source of the input type, and the second input source can be a validation input source used to validate input values provided by the first input data source. For example, the first input source can be more precise than the second input source, but also less reliable. Validating input values generated by the first input source can include computing a difference between a first input value provided by the first input source with a corresponding second input value provided by the second input source, and determining that the first input value is valid if the difference between the two input values is less than a threshold amount. In some implementations, input values provided by validation input sources are not provided to the control system 120. For example, the safety system 110 can receive input values from a main LIDAR (whose values are used by the control system 120) and receive input values from a validation LIDAR (whose values are compared with the values of the main LIDAR to validate the values of the main LIDAR, but not passed to the control system 120). However, any suitable type of input validation can be performed.

Providing input values S230 can include providing validated input values. In some implementations, validated input values are provided to the control system 120. Additionally, or alternatively, un-validated input values (e.g., received at S21o) are provided to the control system 120 at S230. S230 can include the safety system 110 providing at least one received input value to the control system 120. The safety system 110 can provide input values to the control system via any suitable type of connection or interface (e.g., via a safety system interface 150, etc.).

Performing command gating S240 can include one or more of: receiving at least one control value S241 (e.g., a control value generated by using unvalidated input values, validated input values provided at S223, etc.); determining a safety condition S242; and performing an action based on the received control value S243. Performing an action can include passing an initial control value to a system under control, generating a safe control value based on an accessed initial control value, etc.

In some implementations, a command gate (e.g., 112) performs at least a portion of one or more of S241, S242, and S243. In some implementations, a safety sub system (e.g., 110) performs at least a portion of one or more of S241, S242, and S243. In an example, the command gate performs S241 and S243 based on a safety condition determined by a safety sub system at S242 (and identified by safety information received by the command gate at S243). However, S241-243 can otherwise be performed.

In some implementations, a safety sub system (e.g., 110) performs at least a portion of one or more of S210, S22o, and S230. In some implementations, a command gate (e.g., 112) performs at least a portion of S230.

Receiving at least one control value S241 can include the safety system 110 receiving at least one control value from the control system 120. The safety system 110 can receive control values from the control system via any suitable type of connection or interface (e.g., via a safety system interface 150, etc.). In some variations, control values can represent information provided by the control system 120, such as, for example, one or more of: a requested speed, a requested steering value, or any other suitable type of command or information provided by the control system 120.

Determining a safety condition S242 can include determining safety information. In some variations, a safety condition is identified by using one or more of information related to at least one communication link, input values received from at least one input source (e.g., at S210), information related to the system under control (e.g., 140), information related to the control system 120, information related to the safety system 110, and operating mode of the system under control 140.

In some variations, the safety system 110 uses at least one of the following to determine the safety condition (and optionally safety information): a machine learning model, a neural network, a rules engine, a rule set, a table, and a database.

In some implementations, the safety system 110 uses a rule set to determine the safety condition. In some implementations, the rule set is used to determine a safety condition based on one or more of: sensor values; state of the control system 120 (e.g., valid, safe, unsafe, etc.); operating mode of the control system 120 (e.g., identified by watchdog information received form the control system 120); operating mode of the system under control 140; operating mode of the safety system 110; configuration parameters; and any other suitable internal or external system parameters.

In an example, the rule set includes at least one sensor rule that defines a set of required sensors, and operating limits for reach required sensor (and optionally a safety condition that is enabled if the sensor rule is not satisfied). In a case where at least one sensor identified by the sensor rule is not operating within its operating limits (as identified by the sensor rule), safety information is generated that identifies a safety condition (associated with the safety rule) as being active.

In an example, the rule set includes at least one operating mode rule that defines valid operating modes (e.g., for the control system 120, the system under control 140, the safety system 110, etc.), and optionally identifies a safety condition that is enabled if the operating mode rule is not satisfied.

In a first variation, one or more rule sets can be configured (e.g., by an operator, by the control system 120). In a second variation, rule set configuration is limited to authorized systems and operators. By virtue of using rule sets to determine the safety condition (e.g., as opposed to using a non-deterministic system to determine the safety condition), the safety system can be more easily tested and certified by a safety certification authority.

Performing an action S243 can include one or more of: passing the received control value to the system under control (e.g., 140), generating a safe control value based on received control value, and blocking (or discarding) the received control value. However, any suitable action can be performed.

In some variations, performing an action S243 can include performing the action based on the received control value and the safety condition determined at S242. In some variations, the safety system 110 stores (or accesses) command gating data that identifies actions for one or more control values (or sets of control values) for each safety condition. Performing an action can include accessing command gating data for the safety condition, identifying an action included in the accessed command gating data for the received command value, and performing the identified action.

In some variations, performing an action S243 can include one or more of: determining a control value validation widow S244; validating the received control value using the control value validation window determined S245; and performing an action based on the validation S246.

In some implementations, a command gate (e.g., 112) performs at least a portion of one or more of S244, S245, and S246. In some implementations, a safety sub system (e.g., 110) performs at least a portion of one or more of S244, S245, and S246. In an example, the command gate performs S245 and S246 based on a validation window determined by a safety sub system at S244 (and identified by safety information received by the command gate at S245). However, S244-246 can otherwise be performed.

Determining a control value validation widow S244 can include determining the control validation window based on one or more of: information related to at least one communication link, input values received from at least one input source (e.g., at S210), information related to the system under control (e.g., 140), information related to the control system 120, information related to the safety system 110, operating mode of the system under control 140, and the safety condition determined at S242.

Control value validation windows can be global (applying to all input from all commands) or defined for individual control values, control value types, operating modes, etc.

In some variations, a control value validation window for a received control value is selected based on at least one of control value type (e.g., steering, speed, robotic arm, mode change, etc.), control system 120 characteristics, input values used to generate the control value, input sources used to generate the control value; and operating mode of the system under control 140. However, a control value validation window an otherwise be selected.

In some variations, the safety system 110 uses at least one of the following to determine a control value validation widow: a machine learning model, a neural network, a rules engine, a rule set, a table, and a database.

Figure 4:
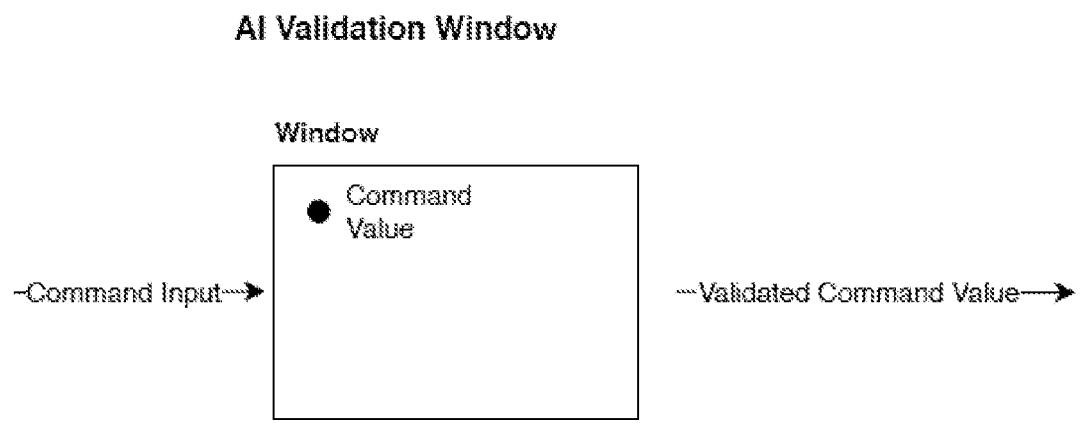
Figure 5:
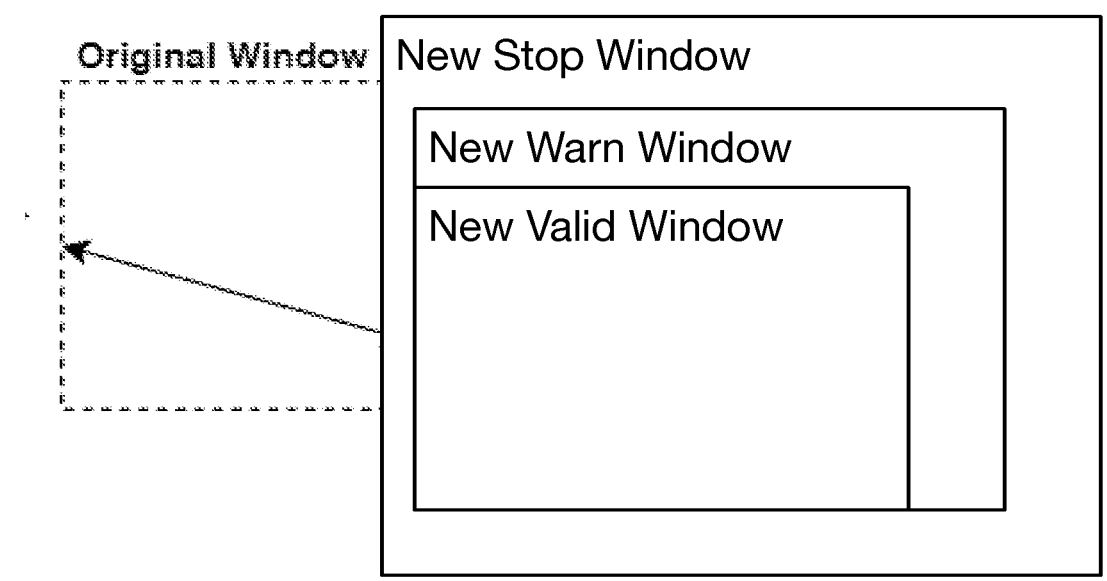

In some variations, at least one safety condition determined at S242 is associated with one or more control value validation windows (e.g., shown in FIGS. 4 and 5). In some variations, at least one operating mode (of the system under control 140) is associated with one or more control value validation windows. In some variations, certain input values of at least one input source are associated with one or more control value validation windows.

In some variations, control value validation windows define boundaries for control values received from the control system 120. Control value validation windows can identify actions to be performed based on a received control values (e.g., from the control system 120). Exemplary control value validation actions can include: providing the control value to the system under control; transforming the control value into a safe control value; discarding the control value; sending a notification to one or more of the control system 120 and the system under control 140; logging the control value (e.g., by identifying one or more of the control value, input values used by the control system to generate the control value, a time, etc.). However, any suitable action can be performed based on a received control value.

Control value validation windows can be stored (or hardcoded) by the safety system 110, or stored by an external system. In some variations, control value validation windows can be configured (e.g., by the control system 120, an operator of the control system 120, the system under control 140, an operator of the system under control, etc.).

In some variations, control value validation windows are defined by performing dataflow characterization in which input values received by the control system 120 and corresponding control values generated by the control system 120 are collected and analyzed to determine boundaries for control values. Dataflow characterization for control value validation windows can be performed during system development, after deployment, or at any suitable time.

FIG. 4 shows an exemplary control value validation window for output generated by the control system 120. In some implementations, the control value validation window is an AI (artificial intelligence) validation window for a control system 120 that uses artificial intelligence to generate control values. In some implementations, the control value validation window can be applied to incoming commands from the control system 120. Such commands can include one or more of: traction motor speed; steering angle; robotic arm joint motion; end effector target location; mode change request (e.g., enable autonomy, enable remote, etc.); or any other suitable value affecting motion or a safety critical function of the system under control. However, any suitable command can be received from the control system. In some variations, at least one control value validation window is updated by performing a process similar to the process for determining a control validation window at S244. However, control value validation windows can be otherwise updated.

In some variations, at least one layered control value validation window (e.g., shown in FIGS. 6 and 7) is generated. The layered control value validation window includes one or more windows layers, with each window layer defining different actions for control value values within the respective window layer. As an example, a first layered control value validation window (e.g., for a command, or a group of commands), can include a valid window layer with a first control value boundary, a warning window layer with a second control value boundary, and a stop window layer with a third control value boundary. The valid window layer has a first action (e.g., pass the value to the system under control 140), the warning window layer has a second action (e.g., send a warning to the control system 120 or system under control 140), and the stop window layer has a third action (e.g., stop the system under control, send a safe control value to the system under control, etc.).

Control validation windows determined at S244 can be used to perform control value validation at S245.

In some variations, validating control values using at least one control validation window S245 includes the safety system 110 validating at least one received control value (e.g., received at S241). Validating a control value using a control value validation window can include determining if a received control value is included within the control value validation window (or one or more layers of the control validation window). If the control value is included within the control value validation window, then the action associated with the control value validation window is identified, and the action for the control value is performed at S246. If the control value is included within more than one layer of the control value validation window, then the action associated with the most restrictive layer is identified, and the action for the control value is performed at S246.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:
1. A system comprising:
a safety subsystem configured to:
during a first time period:
receive a first input value from an input source;

generate a first safety condition based on the first input value; and
output the first safety condition; and
during a second time period succeeding the first time period:
receive a second input value from the input source;
generate a second safety condition based on the second input value; and
output the second safety condition; and
a command gate configured to:
during the first time period:
receive a first unvalidated control value from a control system distinct from the input source;
receive the first safety condition from the safety subsystem;
validate the first unvalidated control value as a first safe control value based on the first safety condition; and
output the first safe control value to a system under control; and
during the second time period:
receive a second unvalidated control value from the control system;
receive the second safety condition from the safety subsystem;
transform the second unvalidated control value into a second safe control value based on the second safety condition; and
output the second safe control value to the system under control.

2. The system of claim 1, wherein the safety subsystem is further configured to:
during the first time period:
receive a first watchdog signal from the control system; and
generate the first safety condition based on the first input value and the first watchdog signal; and
during the second time period:
receive a second watchdog signal from the control system; and
generate the second safety condition based on the second input value and the second watchdog signal.

3. The system of claim 1:
wherein the safety subsystem is further configured to,
during a third time period succeeding the second time period:
receive a third input value from the input source;
generate a third safety condition based on the third input value; and
output the third safety condition; and
wherein the command gate is further configured to, during the third time period:
receive a third unvalidated control value from the control system;
receive the third safety condition from the safety subsystem; and
discard the third unvalidated control value based on the third safety condition.

4. The system of claim 1, wherein the safety subsystem is further configured to:
during the first time period:
detect a first operating mode of the system under control; and
generate the first safety condition based on the first input value and the first operating mode; and
during the second time period:
detect a second operating mode of the system under control; and
generate the second safety condition based on the second input value and the second operating mode.

5. The system of claim 4:
wherein the safety subsystem is further configured to:
during the first time period, generate a first control validation window based on the first input value and the first operating mode; and
during the second time period, generate a second control validation window based on the second input value and the second operating mode; and
wherein the command gate is further configured to:
during the first time period, validate the first unvalidated control value as the first safe control value based on the first control validation window; and
during the second time period, transform the second unvalidated control value into the second safe control value based on the second control validation window.

6. The system of claim 1, wherein the safety subsystem is further configured to:
during the first time period:
detect a first set of link metrics for a first communication interface; and
generate the first safety condition based on the first input value and the first set of link metrics; and
during the second time period:
detect a second set of link metrics for the first communication interface; and
generate the second safety condition based on the second input value and the second set of link metrics.

7. The system of claim 6, wherein the safety subsystem is further configured to:
during the first time period:
detect a first operating mode based on the first set of link metrics; and
generate the first safety condition based on the first input value and the first operating mode; and
during the second time period:
detect a second operating mode based on the second set of link metrics; and
generate the second safety condition based on the second input value the second operating mode.

8. The system of claim 6, further comprising:
the first communication interface characterized by a first interface type; and
a second communication interface characterized by a second interface type different from the first interface type.

9. The system of claim 1, wherein:
the safety subsystem is further configured to output safety information to the command gate, the safety information comprising a set of unsafe command values; and
the command gate configured to validate the first unvalidated control value as the first safe control value comprises the command gate configured to validate the first unvalidated control value as the first safe control value based on:
the second safety condition; and
the set of unsafe command values.

10. The system of claim 1, wherein:
the safety subsystem is further configured to output safety information to the command gate, the safety information comprising a set of transformation rules; and
the command gate configured to validate the first unvalidated control value as the first safe control value comprises the command gate configured to transform the second unvalidated control value into the second safe control value based on:
the second safety condition; and
the set of transformation rules.

11. A system comprising:
a safety subsystem configured to:
during a first time period:
generate a first safety condition based on a first set of link metrics corresponding to a communication interface; and
output the first safety condition; and
during a second time period succeeding the first time period:
generate a second safety condition based on a second set of link metrics corresponding to the communication interface; and
output the second safety condition; and
a command gate configured to:
during the first time period:
receive a first unvalidated control value from a control system;
receive the first safety condition from the safety subsystem;
validate the first unvalidated control value as a first safe control value based on the first safety condition; and
output the first safe control value to a system under control; and
during the second time period:
receive a second unvalidated control value from the control system;
receive the second safety condition from the safety subsystem;
transform the second unvalidated control value into a second safe control value based on the second safety condition; and
output the second safe control value to the system under control.

12. The system of claim 11, wherein the safety subsystem is further configured to:
during the first time period:
detect a first operating mode based on the first set of link metrics; and
generate the first safety condition based on the first operating mode; and
during the second time period:
detect a second operating mode based on the second set of link metrics; and
generate the second safety condition based on the second operating mode.

13. The system of claim 11:
wherein the safety subsystem is further configured to:
during the first time period, generate a first control validation window based on the first set of link metrics; and
during the second time period, generate a second control validation window based on the second set of link metrics; and
wherein the command gate is further configured to:
during the first time period, validate the first unvalidated control value as the first safe control value based on the first control validation window; and
during the second time period, transform the second unvalidated control value into the second safe control value based on the second control validation window.

14. The system of claim 11:
wherein the safety subsystem is further configured to, during a third time period succeeding the second time period:
generate a third safety condition based on a third set of link metrics corresponding to the communication interface; and
output the third safety condition; and
wherein the command gate is further configured to, during the third time period:
receive a third unvalidated control value from the control system;
receive the third safety condition from the safety subsystem; and
discard the third unvalidated control value based on the third safety condition.

15. The system of claim 11, wherein the safety subsystem is further configured to detect the first set of link metrics comprising:
a link status;
a link quality;
a signal strength;
an average message error rate; and
an average message latency.

16. A system comprising:
a safety subsystem configured to:
detect an operating mode of a system under control;
generate a safety condition based on the operating mode;
generate a control validation window based on the safety condition and the operating mode;
output the safety condition and the control validation window; and
a command gate configured to:
receive a unvalidated control value from a control system;
receive the control validation window from the safety subsystem;
generate a safe control value based on the unvalidated control value and the control validation window; and
output the safe control value to the system under control.

17. The system of claim 16, wherein the safety subsystem is further configured to generate the control validation window comprising:
a valid window layer characterized by a first control value boundary; and
a stop window layer characterized by a second control value boundary distinct from the first control value boundary.

18. The system of claim 17, wherein the command gate is further configured to validate the unvalidated control value as the safe control value in response to detecting an intersection between the unvalidated control value and the valid window layer.

19. The system of claim 16, wherein the command gate is further configured to transform the unvalidated control value into the safe control value:
in response to detecting an absence of the unvalidated control value from the valid window layer; and
in response to detecting an intersection between the unvalidated control value and the stop window layer.

20. The system of claim 16:
wherein the safety subsystem is further configured to generate the control validation window comprising a warning window layer characterized by a third control value boundary distinct from the first control value boundary and the second control value boundary; and wherein the command gate is further configured to send a notification to the system under control:
 in response to detecting an absence of the unvalidated control value from the valid window layer; and
 in response to detecting an intersection between the unvalidated control value and the warning window layer.

\* \* \* \* \*